United States Patent
Meusel et al.

(10) Patent No.: US 10,180,159 B2
(45) Date of Patent: Jan. 15, 2019

(54) HYBRID BEARING BLOCK FOR A CAMSHAFT

(71) Applicant: ThyssenKrupp Presta TecCenter AG, Eschen (LI)

(72) Inventors: Juergen Meusel, Dittmannsdorf (DE); Uwe Dietel, Lichtentanne (DE); Mario Lindner, Chemnitz (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 0 days.

(21) Appl. No.: 15/318,526

(22) PCT Filed: Jun. 23, 2015

(86) PCT No.: PCT/EP2015/064089
§ 371 (c)(1),
(2) Date: Dec. 13, 2016

(87) PCT Pub. No.: WO2015/197606
PCT Pub. Date: Dec. 30, 2015

(65) Prior Publication Data
US 2017/0122365 A1    May 4, 2017

(30) Foreign Application Priority Data
Jun. 25, 2014   (DE) .......... 10 2014 108 879

(51) Int. Cl.
*F16C 17/22*  (2006.01)
*F01L 1/04*   (2006.01)
(Continued)

(52) U.S. Cl.
CPC .............. *F16C 17/22* (2013.01); *F01L 1/047* (2013.01); *F01L 1/053* (2013.01); *F02F 1/24* (2013.01);
(Continued)

(58) Field of Classification Search
CPC .... F16C 9/00; F16C 9/02; F16C 17/22; F16C 33/08; F16C 33/1045; F16C 35/02;
(Continued)

(56) References Cited

U.S. PATENT DOCUMENTS 1,331,961 A * 2/1920 Klocke .................. F16C 33/14
29/898.059
2,371,399 A * 3/1945 Mantle ................ B22D 19/085
29/413

(Continued)

FOREIGN PATENT DOCUMENTS

CN   1169918 A   1/1998
CN   102312925 A  1/2012
(Continued)

OTHER PUBLICATIONS

English translation of International Search Report for International patent application No. PCT/EP2015/064089; dated Sep. 3, 2015.
(Continued)

*Primary Examiner* — Alan B Waits
(74) *Attorney, Agent, or Firm* — thyssenkrupp North America, Inc.

(57) ABSTRACT

A bearing apparatus for mounting a camshaft in a cylinder head of an internal combustion engine may include a bearing element that surrounds a bearing ring in which the camshaft is rotatably mounted or mountable. The bearing element may be made of a first material whose expansion coefficient is greater than an expansion coefficient of a second material of which the bearing ring is made. An outer surface of the bearing ring may include a contour that engages in a form-fitting manner with a mating contour formed on an inner surface of the bearing element that surrounds the bearing ring. The contouring formed by the contour and the
(Continued)

mating contour may form retaining structures that brace against one another in instances of thermal expansion.

16 Claims, 2 Drawing Sheets

(51) Int. Cl.
| | |
|---|---|
| *F16C 33/10* | (2006.01) |
| *F02F 1/24* | (2006.01) |
| *F01L 1/053* | (2006.01) |
| *F01L 1/047* | (2006.01) |
| *F16C 35/02* | (2006.01) |

(52) U.S. Cl.
CPC .......... *F16C 33/1045* (2013.01); *F16C 35/02* (2013.01); *F01L 2001/0476* (2013.01); *F16C 2220/06* (2013.01); *F16C 2360/18* (2013.01)

(58) Field of Classification Search
CPC . F16C 2220/06; F16C 2360/18; F02F 7/0053; F02F 2007/0056; F02F 1/24; F01L 1/047; F01L 1/053; F01L 2001/0476
See application file for complete search history.

(56) References Cited

U.S. PATENT DOCUMENTS

| | | | | | |
|---|---|---|---|---|---|
| 2,371,400 | A | * | 3/1945 | Mantle | F16C 9/04 29/888.09 |
| 3,084,003 | A | * | 4/1963 | Matt | F16C 33/08 123/193.1 |
| 3,089,735 | A | * | 5/1963 | Mann | B22D 19/08 123/195 R |
| 8,801,291 | B2 | * | 8/2014 | Kamata | F16C 33/08 384/276 |
| 8,974,121 | B1 | * | 3/2015 | Rudolph | F16C 17/04 384/420 |
| 9,062,599 | B2 | * | 6/2015 | Harada | F16C 9/02 |
| 2001/0033703 | A1 | * | 10/2001 | Martin | F16C 9/02 384/296 |
| 2002/0020287 | A1 | * | 2/2002 | Yamauchi | F02F 1/108 92/73 |
| 2003/0051543 | A1 | * | 3/2003 | Mairhofer | G01M 13/04 73/114.42 |
| 2003/0091251 | A1 | * | 5/2003 | Ni | F16C 33/08 384/295 |
| 2004/0231154 | A1 | * | 11/2004 | Wisniewski | B23D 31/003 29/888.09 |
| 2007/0209628 | A1 | * | 9/2007 | Natkin | F02F 7/0053 123/195 R |
| 2008/0310787 | A1 | | 12/2008 | Waseda et al. | |
| 2012/0177310 | A1 | * | 7/2012 | Tsuchiya | F16C 9/02 384/294 |
| 2012/0224798 | A1 | * | 9/2012 | Kamata | F16C 33/08 384/276 |
| 2013/0118444 | A1 | * | 5/2013 | Harada | F16C 9/02 123/198 R |
| 2013/0343683 | A1 | * | 12/2013 | Sanda | F01M 5/02 384/397 |
| 2014/0305399 | A1 | * | 10/2014 | Pegg | F02F 7/0053 123/193.5 |
| 2017/0152885 | A1 | * | 6/2017 | Kato | F01M 11/02 |
| 2017/0314507 | A1 | * | 11/2017 | Ikehara | F02F 7/0053 |

FOREIGN PATENT DOCUMENTS

| | | |
|---|---|---|
| DE | 14 25 123 A | 2/1969 |
| DE | 100 34 329 A1 | 1/2002 |
| DE | 20 2006 014 691 U1 | 12/2006 |
| DE | 20 2007 006 206 U1 | 8/2007 |
| DE | 10 2009 051 470 A1 | 5/2011 |
| DE | 10 2012 007 334 A1 | 10/2013 |
| EP | 0 363 159 A2 | 4/1990 |
| GB | 1 113 623 A | 5/1968 |

OTHER PUBLICATIONS

English language Abstract for DE 10 2012 007 334 A1 listed above.
Office Action for German Priority Application DE 10 2014 108 879.4.

* cited by examiner

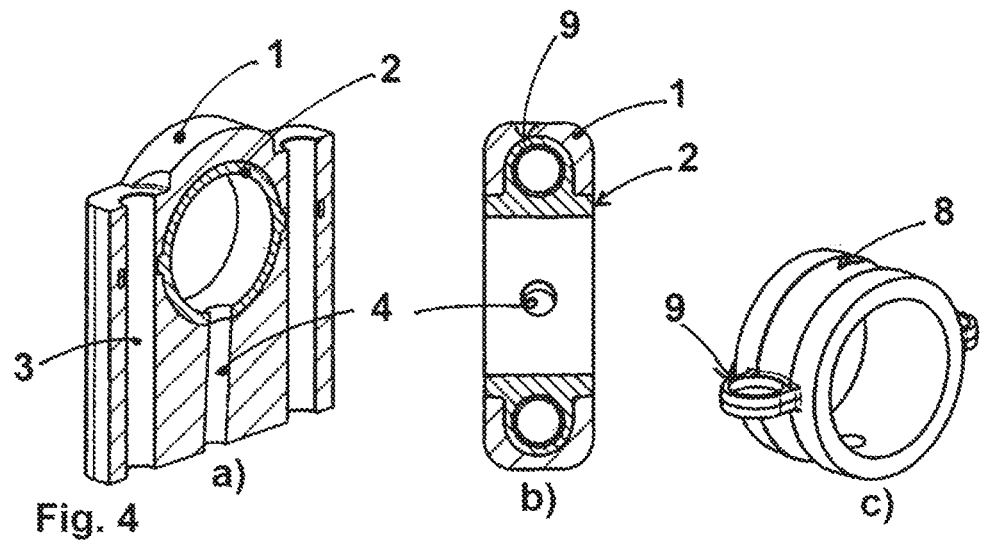
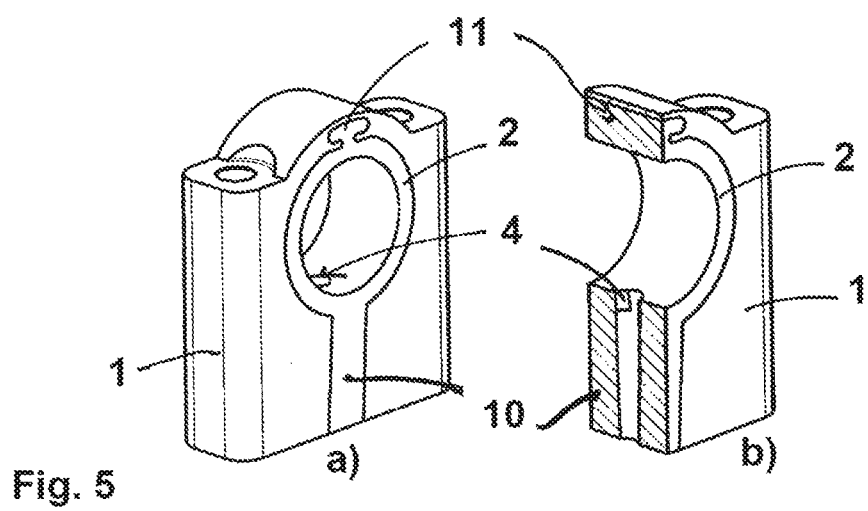
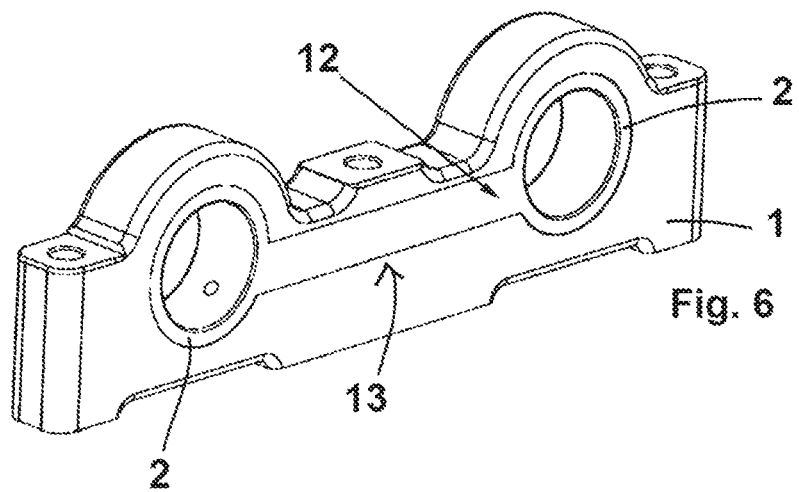

US 10,180,159 B2

HYBRID BEARING BLOCK FOR A CAMSHAFT

CROSS-REFERENCE TO RELATED APPLICATIONS

This application is a U.S. National Stage Entry of International Patent Application Serial Number PCT/EP2015/064089, filed Jun. 23, 2015, which claims priority to German Patent Application No. DE 10 2014 108 879.4 filed Jun. 25, 2014, the entire contents of both of which are incorporated herein by reference.

FIELD

The present disclosure generally relates to camshafts as well as bearing apparatuses for mounting camshafts in cylinder heads of internal combustion engines.

BACKGROUND

Camshafts which are mounted in sliding bearings have been known for a long time and require no particularly high outlay in terms of design. However, since, for weight-reduction purposes, an ever-increasing number of internal combustion engine parts are made of particularly lightweight materials such as aluminum or even plastic, particular attention must be paid to the transitions between the components made of different materials. In the case of the camshafts, for example, the bearing elements are made of lightweight materials while the camshafts themselves are, as ever, made of steel alloys.

As is known, the lightweight materials have greater expansion coefficients (aluminum: longitudinal expansion coefficient $\alpha=23.1*10^{-6}$ $K^{-1}$) than steel alloys, whose longitudinal expansion coefficients are approximately half of this. Indeed, the spatial expansion coefficient $\gamma$ can even be $\gamma=3*\alpha$. Due to these different expansion coefficients of a camshaft which is made of steel and is mounted in a bearing made of aluminum, the bearing play changes as the engine heats up such that the bearing gap increases. As the engine heats up, the increasing bearing gap leads to an accordingly increased oil throughput. In that context, this effect is independent of the design of the bearing, in particular whether this is in the form of a bearing block module or as a conventional mounting in the cylinder head or a guide frame. In that context, it is immaterial whether the bearing channel is split or closed.

DE 10 2012 007 334 A1 discloses a plastic camshaft module as a bearing support, which is cast or injected around separately produced steel bearing rings. However, the bearing rings are not adequately held in the plastic.

BRIEF DESCRIPTION OF THE FIGURES

FIG. 1a is a perspective view of an example bearing ring with undercuts, injected into an example bearing block.

FIG. 1b is a perspective sectional view of the bearing ring and bearing block of FIG. 1a.

FIG. 3a is a perspective view of an example bearing block with an example contoured bearing ring.

FIG. 3b is a perspective view of the contoured bearing ring of FIG. 3a.

FIG. 4a is a perspective sectional view of an example bearing block.

FIG. 4b is a sectional view of an example injected bearing ring with lateral eyelets.

FIG. 4c is a perspective view of the bearing ring of FIG. 4b illustrating the lateral eyelets and a circumferentially-extending groove.

FIG. 5a is a perspective view of an example bearing block with an injected bearing ring comprising an anchor.

FIG. 5b is a perspective sectional view of the bearing block of FIG. 5a.

FIG. 6 is a perspective view of an example dual bearing plate injected into an example bearing block.

DETAILED DESCRIPTION

Figure 1:
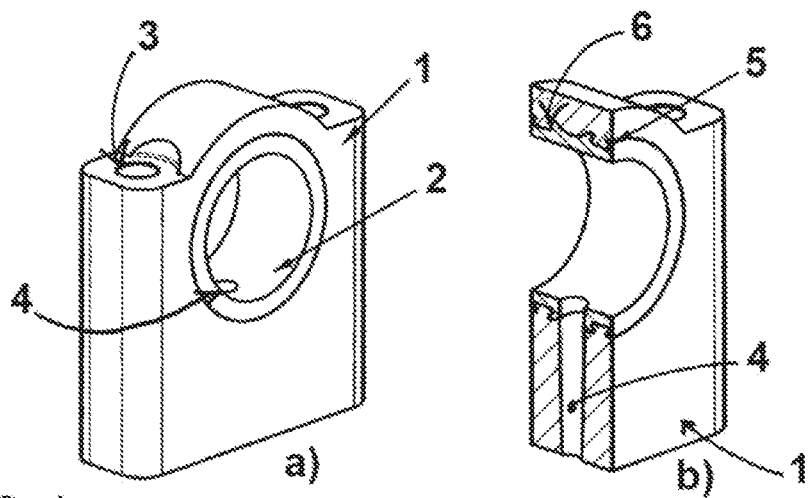

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to bearing apparatuses for mounting camshafts in cylinder heads of internal combustion engines. One example object of the present disclosure is to disclose such bearing apparatuses that have a simple construction, are cost-effective to produce, are lightweight and sufficiently stable while having a bearing play, with respect to the camshaft, that is as constant as possible over the entire temperature range of an internal combustion engine, and thus reduces the oil throughput. The present disclosure also generally relates to a system including a bearing element, a bearing ring, and a camshaft. In some examples, a bearing element may surround a bearing ring in which a camshaft is rotatably mounted. The bearing element may be made of a first material whose expansion coefficient is greater than the expansion coefficient of the second material from which the bearing ring is made.

Those having ordinary skill in the art will understand that although the present disclosure generally makes reference to 'bearing elements,' a bearing element in many cases is one part of a broader bearing apparatus. To this end, a bearing block, which in itself may take on a wide variety of forms, is merely one exemplary type of bearing element.

In some examples, the present disclosure makes use of the properties of a material pairing and therefore the different expansion coefficients of the materials from which the bearing element and the bearing ring are made in order to use the different expansions to support the mutual bracing. A particularly preferred material pairing, at least in some examples, involves making the bearing ring and the camshaft from a steel or a gray cast iron, in particular GJL, while the bearing element surrounding the bearing ring is made of a more lightweight material such as aluminum or a magnesium alloy. In order to achieve even expansion, it is advantageous in many instances if the expansion coefficient of the second material, which the bearing ring is made of, is at least approximately identical to that of the material which the camshaft, which is to be accommodated, is made of.

One aspect of the present disclosure lies in the particular contouring of the transition surfaces formed between the bearing element and the bearing ring. In that context, the contouring is understood as the pairing of the contour on the bearing ring and the mating contour on the bearing element. According to the present disclosure, both sides of this contouring comprise retaining structures which hold the bearing ring and the bearing element together. According to the present disclosure, these retaining structures are designed such that they make use of the effect of the differential expansion under heating to further strengthen the mutual engagement instead of weakening it. Thus, an expansion leads to ever stronger bracing of the retaining structures. The contouring according to some examples of the present disclosure achieves a certain improvement in the adhesion of the inserted bearing ring and a targeted transfer of forces between the bearing ring and the bearing element.

Thus, the system according to the invention encompasses a bearing element which is made of the first material and in which a bearing ring, made of a second material, is held in a form-fitting manner. The camshaft which is rotatably mounted in the bearing ring is another part of the system and is made of a third material. According to the invention, the expansion coefficient of the first material of the bearing element is greater than the expansion coefficient of the second material and of the third material.

According to the invention, the outer surface of the bearing ring is provided with a contour which engages in a form-fitting manner with a mating contour formed on the inner surface, surrounding the bearing ring, of the bearing element, wherein the contouring formed by the contour and the mating contour forms retaining structures which brace against one another in the event of thermal expansion. In that context, the expansion coefficients of the second and third materials are at least approximately identical.

The effect of the optimized hold and of the good transfer of force can for example be achieved by the retaining structures forming undercuts, which can, to a certain extent, compensate for different material expansions. In that context, it is advantageous if the contouring thus formed is recessed into the outer surface of the bearing ring as a structure consisting of recesses, and surrounds the bearing ring in axisymmetric fashion. The mating contour formed on the bearing element then accordingly engages in the recesses.

Alternatively or cumulatively, the retaining structure can also form one or more anchors/anchorages which project into the respective other material. In this case, it is advantageous if the contouring extends out from the outer surface of the bearing ring, such that it rises above the outer surface and forms at least one anchor engaging in the bearing element.

Another possibility involves providing retaining structures consisting of toothings extending in both the axial and circumferential directions, wherein the surfaces can advantageously be roughened by a mechanical or chemical process, for example using the alfin process, thus increasing the surface area.

However, all of these embodiments share the fact that the outer surface of the bearing ring is provided with a contour which engages in a form-fitting manner with a mating contour formed on the inner surface, surrounding the bearing ring, of the bearing element. According to the invention, the contouring formed by the contour and the mating contour is such that it forms retaining structures which brace against one another in the event of thermal expansion.

In addition to improving the retention of the bearing ring in the bearing element, this bracing also ensures that the bearing ring does not widen under heating more than the expansion of the camshaft mounted therein. Thus, the targeted use of the differential thermal expansion of the hybrid material system of the mount that forms the counterpart to the camshaft also achieves a constant bearing play between the camshaft and the bearing ring, and therefore a constant, low consumption of lubricating oil. The hybrid material system also makes it possible to cost-effectively create a simple bearing element which is lightweight and yet sufficiently stable.

In a particularly preferred embodiment, the camshaft mount is of modular overall construction. To that end, it is advantageous if the contoured bearing ring according to the invention is held in a module in the form of a bearing block. Ideally, the bearing ring is integrated by casting into the bearing block, which is in particular made of aluminum or a magnesium alloy.

Since a camshaft module generally comprises two parallel camshafts, it is moreover particularly advantageous if two bearing rings are connected to a common anchor designed as a bridge element, in the form of a "dual bearing plate". In one advantageous embodiment, the dual bearing plate thus formed is cast into the bearing element. Thus, the hybrid construction according to the invention is applied to double bearing blocks. The particular advantage of this embodiment is that the tooth flank play remains constant irrespective of temperature since the material of the dual bearing plate has the same expansion coefficient as the toothed wheels seated on the camshafts. This reduces noise emissions.

FIG. 1a shows a separate bearing block 1 which, together with a bearing ring 2 injected or cast therein, forms a mount for a camshaft (not shown) in a cylinder head of an internal combustion engine. The bearing block 1 is cast from aluminum and comprises two screw bores 3 by means of which it is secured to the base of a camshaft module. Also visible is an oil duct 4 in the form of a bore which leads from below, through the bearing block 1 and the bearing ring 2, into the sliding bearing (see also FIG. 1b). FIG. 1b shows a section through the bearing block 1 of FIG. 1a. It shows the contour 5 introduced into the outer jacket of the bearing ring 2 with two undercuts 6 that are formed by a raised portion having an M-like profile. The material of the bearing block 1 engages behind the undercuts.

Figure 2:
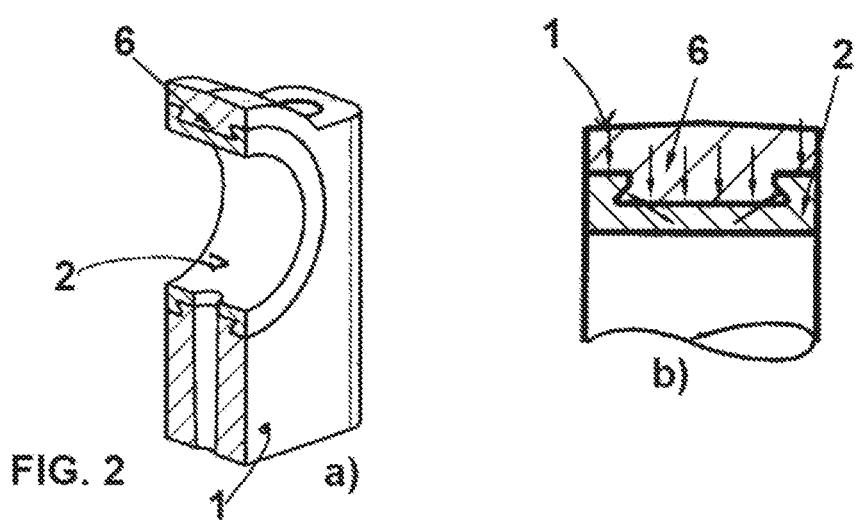
FIG. 2a is a perspective sectional view of another example bearing ring with undercuts, injected into an example bearing block.
FIG. 2b is a cross-sectional view of the bearing ring and bearing block of FIG. 2a illustrating the transfer of forces from the bearing block to the bearing ring.

FIG. 2a shows a similar combination of a bearing block 1 and a cast-in bearing ring 2, in a section view. In this case, the contouring is a dovetail recess 6 which is incised into the outer jacket of the bearing ring. FIG. 2b shows the dovetail profile of the recess 6 in detail. Also, the arrows show the force flow of the cooling bearing block 1 on the bearing ring 2. As can be seen, this force flow is radially inward. On heating, the aluminum bearing block 1 expands more than the steel bearing ring 2, resulting in tension in the axial direction.

Figure 3:
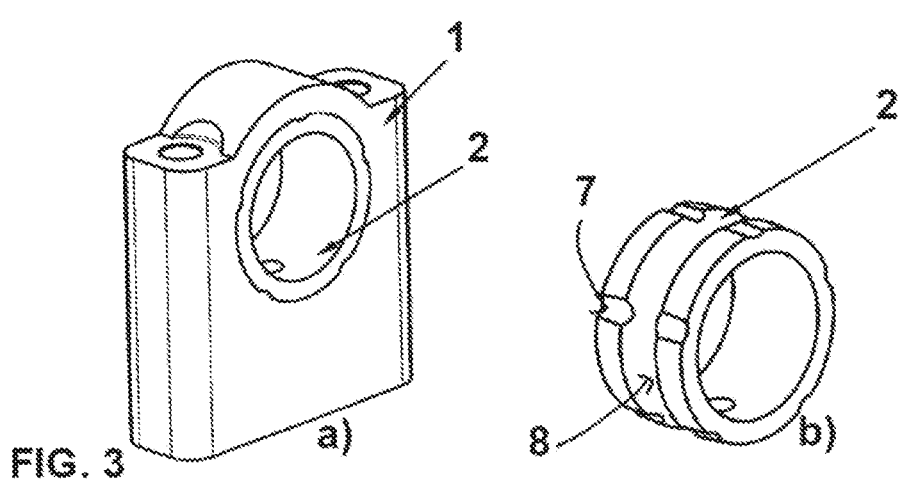

FIGS. 3a and 3b show a variant embodiment in which there are provided retaining structures in the form of axially extending recesses 7 and a circumferentially extending groove 8. In that context, the surface areas are increased using the alfin process, so as to result in better adhesion.

FIG. 4 shows an embodiment in the cutaway state, in which the retaining structure of the bearing ring 2 forms multiple anchors that reach into the material of the bearing block 1 and are surrounded thereby in form-fitting fashion. In that context, two molded-on eyes 9, which are molded-on on either side of the bearing ring 2 in the screwing plane and are dimensioned such that the bores of the eyelets 9 are in line with the lateral screw bores 3, serve as anchors. If the bearing block is screwed onto the camshaft module by means of screws inserted into the screw bores 3, the screws also pass through the eyelets 9. As is also the case of the embodiment shown in FIG. 3, a circumferentially extending groove 8 is provided in the bearing ring 2 and provides additional stability. It can be seen that this embodiment also has an oil duct 4 that leads into the bearing ring 2.

In the exemplary embodiment of FIG. 5, the oil duct 4 is introduced into the anchor 10 that is molded onto the bearing ring 2 and projects vertically downward. In that context, another axial protrusion 11, which is undercut by the material of the bearing block, can be provided at the upper end of the bearing ring 2 as shown in FIG. 5.

In the exemplary embodiment of FIG. 6, two bearing rings 2 are connected via a common anchor in the form of a bridge element 12, and thus form a "dual bearing plate" 13. The dual bearing plate formed in this manner is again cast into the bearing element 1.

LIST OF REFERENCE SIGNS

1 Bearing block
2 Bearing ring
3 Screw bore
4 Oil duct
5 Contour
6 Undercuts
7 Recesses
8 Groove
9 Eyelet
10 Anchor
11 Protrusion
12 Bridge element
13 Dual bearing plate

What is claimed is:

1. A bearing apparatus for mounting a camshaft, the bearing apparatus comprising:
   a bearing block including two screw bores by way of which the bearing block is securable to a base of a camshaft module, the bearing block further including an oil duct;
   a first bearing ring in which a camshaft is rotatably mounted or mountable, the first bearing ring being injected or cast into the bearing block, wherein the first bearing ring includes an outer surface having a contour that is adjacent to the bearing block and retains the first bearing ring within the bearing block, wherein the first bearing ring receives oil from the oil duct; and
   a second bearing ring, wherein the first and second bearing rings are connected by a bridge element that is secured in the bearing block, and wherein the first bearing ring, the second bearing ring and the bridge element are formed together as one piece.

2. The bearing apparatus of claim 1 wherein the contour of the outer surface of the first bearing ring comprises two undercuts that are formed by a raised portion having an "M"-shaped profile.

3. The bearing apparatus of claim 1 wherein the contour of the outer surface of the first bearing ring is configured as a dovetail recess.

4. The bearing apparatus of claim 1 wherein an expansion coefficient of the bearing block is greater than an expansion coefficient of the first bearing ring.

5. The bearing apparatus of claim 1 wherein the contour of the outer surface of the first bearing ring comprises a retaining structure for a connection between the first bearing ring and the bearing block.

6. The bearing apparatus of claim 5 wherein the retaining structure comprises an axially-extending recess.

7. The bearing apparatus of claim 5 wherein the retaining structure comprises a circumferentially-extending groove.

8. The bearing apparatus of claim 5 wherein the retaining structure comprises anchors that extend into the bearing block and are surrounded by the bearing block in form-fitting fashion.

9. The bearing apparatus of claim 5 wherein the retaining structure comprises an anchor that extends into and is surrounded at least partially by the bearing block, wherein the anchor comprises an oil duct.

10. The bearing apparatus of claim 1 wherein the first bearing ring comprises two lateral eyelets that have bores that overlap with the two screw bores of the bearing block.

11. A bearing apparatus for mounting a camshaft in a cylinder head of an internal combustion engine, the bearing apparatus comprising:
    a bearing element that is comprised of a first material that has a first expansion coefficient,
    a first bearing ring in which a camshaft is rotatably mounted or mountable, the first bearing ring comprised of a second material having a second expansion coefficient, wherein the first expansion coefficient is greater than the second expansion coefficient, wherein the first bearing ring is surrounded by the bearing element; and
    a second bearing ring,
    wherein the first bearing ring includes an outer surface with a contour that engages in a form-fitting manner a mating contour of an inner surface of the bearing element that surrounds the first bearing ring, wherein the contour and the mating contour form a retaining structures that brace against one another in an event of thermal expansion, wherein the contour is raised above the outer surface of the first bearing ring and forms an anchor that engages in the bearing element,
    wherein the first and second bearing rings are connected by a common anchor configured as a bridge element and form a dual bearing plate that is cast into the bearing element.

12. The bearing apparatus of claim 11 wherein the first bearing ring is cast into the bearing element, with the bearing element being configured as a single bearing block.

13. The bearing apparatus of claim 11 wherein the contour is recessed into the outer surface of the first bearing ring and surrounds the first bearing ring in axisymmetric fashion, wherein the mating contour engages in the recessed contour.

14. The bearing apparatus of claim 11 wherein the second expansion coefficient is approximately equal to or greater than an expansion coefficient of material of which the camshaft is comprised.

15. The system of claim 14 wherein the second expansion coefficient and the expansion coefficient of material of which the camshaft is comprised differ by less than 5%.

16. The system of claim 14 wherein the first bearing ring and the camshaft are comprised of a steel or a gray cast iron, wherein the bearing element is comprised of aluminum or a magnesium alloy.

* * * * *